United States Patent [19]

Jada

[11] Patent Number: 5,053,214

[45] Date of Patent: Oct. 1, 1991

[54] PROCESS FOR PRODUCING ZIRCONIUM BASED GRANULES

[75] Inventor: Sivananda S. Jada, Englewood, Colo.

[73] Assignee: Manville Corporation, Denver, Colo.

[21] Appl. No.: 522,348

[22] Filed: May 11, 1990

Related U.S. Application Data

[60] Division of Ser. No. 131,594, Dec. 11, 1987, Pat. No. 4,927,622, which is a continuation-in-part of Ser. No. 65,809, Jun. 19, 1987, abandoned.

[51] Int. Cl.$^5$ ............................................. C01G 25/02
[52] U.S. Cl. .................................. 423/608; 423/266; 501/103; 501/104
[58] Field of Search ............... 501/103, 104; 423/266, 423/608

[56] References Cited

U.S. PATENT DOCUMENTS

| | | | |
|---|---|---|---|
| 3,334,962 | 8/1967 | Clearfield | 501/103 |
| 4,501,818 | 2/1985 | Rossi | 501/103 |
| 4,664,894 | 5/1987 | Suzuki et al. | 423/608 |
| 4,719,091 | 1/1988 | Wusirika | 501/103 |
| 4,927,622 | 5/1990 | Jada | 423/608 |

FOREIGN PATENT DOCUMENTS

| | | | |
|---|---|---|---|
| 0194556 | 9/1986 | European Pat. Off. | 501/103 |
| 56-145118 | 11/1981 | Japan | 501/103 |
| 60-176920 | 9/1985 | Japan | 501/103 |
| 62-132708 | 6/1987 | Japan | 501/103 |

Primary Examiner—William R. Dixon, Jr.
Attorney, Agent, or Firm—John D. Lister; Cornelius P. Quinn

[57] ABSTRACT

Zirconium based granules are produced by the steps of forming an aqueous solution of a zirconium compound such as zirconium acetate, combining the aqueous solution with a phase stabilizer, and then heating the solution to evaporation thereby forming amorphous zirconium based granules.

In an alternate embodiment, an alcohol solution of a zirconium compound such as zirconium propoxide in propanol is acidified and hydrolyzed with water. The partially or fully hydrolyzed zirconium complex is mixed with a phase stabilizer to form a homogeneous solution. The solution is then subjected to evaporation by heat to form amorphous zirconium based granules.

Zirconia fibers are produced by making aqueous solutions of the amorphous zirconium based granules containing the phase stabilizer to the desired viscosity, fiberizing the solution, and finally converting the fibers under appropriate conditions.

8 Claims, 6 Drawing Sheets

PROCESS FOR PRODUCING ZIRCONIUM BASED GRANULES

This is a division, of application Ser. No. 07/131,594, filed Dec. 11, 1987, now U.S. Pat. No. 4,927,622 which is a continuation-in-part of application Ser. No. 07/065,809 filed June 19, 1987 now abandoned.

FIELD OF THE INVENTION

This invention relates to novel processes for the production of ceramic granules and more particularly, it relates to novel processes for the production of amorphous zirconium based granules. This invention further relates to novel processes for the production of zirconium oxide fibers.

BACKGROUND OF THE INVENTION

The existence of ceramic oxide, e.g. alumina and zirconia, powders and fibers is known to those skilled in the art.

U.S. Pat. No. 3,180,741 discloses a conventional process for the preparation of ceramic (refractory) fibers. The conventional process involves the steps of forming a dilute solution of a ceramic oxide precursor such as zirconium acetate followed by concentrating the solution to the desired viscosity. The concentrated solution of desired viscosity is then fiberized with the resulting fibers subsequently heated in an oxygen containing atmosphere to form an oxide fiber. A difficulty encountered in this process is the required concentration of the ceramic oxide precursor solution. This is because the typical modes of concentration, e.g. vacuum evaporation and solids precipitation, are not only time consuming and cumbersome but also if they are not properly controlled can lead to solutions of either too high or too low of viscosities to subsequently fiberize. If the resulting viscosity is too high, the solution is difficult to spin into fibers. A solution of too low of viscosity yields inferior fibers, if any.

U.S. Pat. No. 4,159,205 discloses that fibers made by such conventional methods had insufficient strength and flexibility for many applications.

In recent years, attempts have been made to viscosify the solution by the addition of certain organic acids. U.S. Pat. No. 4,159,205 discloses that the addition of acetic acid to spinning solutions results in fibers which were still too brittle for many applications because of the lack of control of nucleation, grain size, phase stabilization, and crystallization behavior. Although the use of lactic acid is disclosed as an alternative, it is possible that fibers of non-uniform cross sections, poor reproducibility, and relatively poor physical properties can result.

As disclosed by U.S. Pat. No. 4,619,817 there are five main methods that have been reported to date for producing partially stabilized zirconia powders (granules): (1) powder mixing, (2) coprecipitation and decomposition, (3) vapor phase decomposition, (4) sol-gel processing, and (5) hydrothermal processing. As disclosed by U.S. Pat. No. 4,619,817 difficulties lay in utilizing the methods in that each is specialized and therefore has its own distinct drawbacks and disadvantages.

From the foregoing discussion, it is readily apparent that each known method for the production of ceramic oxide powders and fibers has disadvantages and drawbacks. Because of the continuing demand for ceramic oxide powders and fibers, improved methods which eliminate any of the drawbacks of the conventional methods and which are practical and economical to utilize would be highly advantageous.

BRIEF SUMMARY OF THE INVENTION

In accordance with the present invention, there are provided two novel processes for the production of water soluble, amorphous zirconium based granules. Each inventive method employs a starting solution of $$Zr(R)_4$$

wherein each R group individually represents either

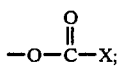

$-OX$; $-NO_3$; $-OH$; $-OY$; or halogen and X represents a $C_1$ to $C_{10}$ hydrocarbyl group and Y represents halogen.

In one embodiment, an aqueous solution comprising $Zr(R)_4$ is formed and then mixed with a suitable stabilizing agent, e.g. CaO, CeO$_2$, Y$_2$O$_3$, MgO, SiO$_2$, hafnium oxide, and the like and mixtures thereof. The aqueous solution of stabilized zirconium complex is then dried at a temperature below about 250° C. to form amorphous, dried granules which contain said phase stabilizer.

In another embodiment, an alcohol or the like solution of $Zr(R)_4$ is formed and then acidified and hydrolyzed, in either order, to form a solution comprising a zirconium based complex which is subsequently mixed with a phase stabilizer. The solution is then evaporated by drying at a temperature below 250° C. thereby forming amorphous zirconium based granules which contain the phase stabilizer.

In further accordance with the present invention, processes for the production of zirconium oxide fibers are provided. In each embodiment, the amorphous zirconium based granules produced by the foregoing disclosed inventive processes are formed in an aqueous solution to the desired viscosity and are subsequently fiberized and heated under suitable conditions of time and temperature to zirconium oxide fibers.

The inventive processes for forming zirconium based granules are easy to practice and do not carry the disadvantages of the aforementioned conventional methods. The starting materials, e.g. zirconium acetate, zirconium propoxide, zirconium oxychloride, and the like covered by the general formula $Zr(R)_4$ are commercially readily available and are easy to make into solutions with water, alcohols, or the like. The zirconium compounds can be easily mixed with stabilizers and moreover, the homogeneous solutions can very readily be evaporated to dryness and the zirconium based granules thereby formed by a simple heat treatment step.

Additionally, the inventive processes for the production of zirconium oxide (zirconia) fibers are easy to practice and obviate the drawbacks associated with conventional processes. The zirconia fibers are made from aqueous solutions of zirconium based granules which can function as zirconium oxide precursors. No cumbersome or tedious concentration step is required and the desired viscosity range for the solution can be readily achieved and controlled. Consequently, fibers of uniform diameter, grain size, little or no shot content and reproducible properties can be produced.

Other features and aspects of the invention, as well as their benefits, will be made clear in the more detailed description of the invention which follows.

DETAILED DESCRIPTION OF THE INVENTION

Figure 1:
FIG. 1 is a scanning electron micrograph (SEM) of zirconia fibers containing CaO, prepared according to the present invention; sintered in oven in air at 1250° C. for 2 hours; 200× magnification.
Figure 2:
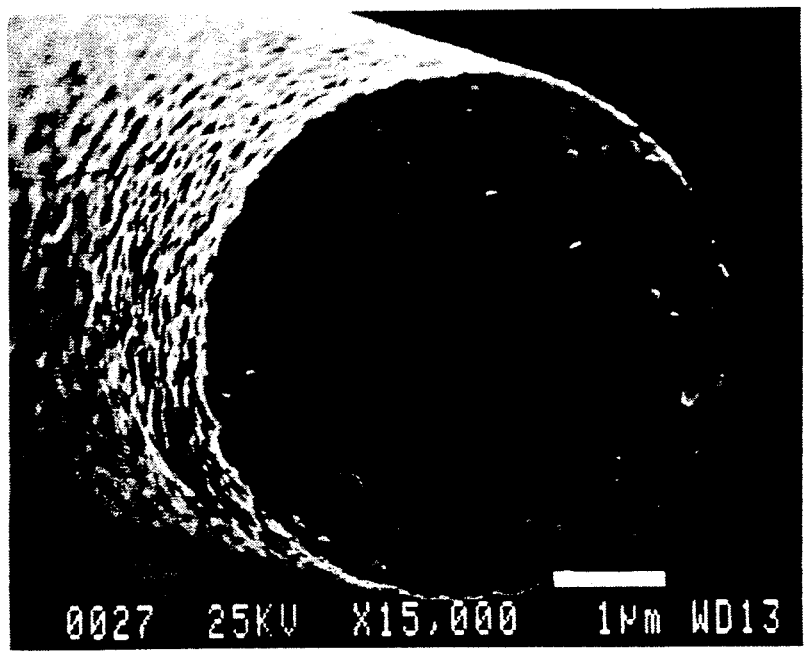
FIG. 2 is a scanning electron micrograph (SEM) of single zirconia fibers containing CaO, prepared according to the present invention; sintered in oven at 1250° C. in air for 2 hours; 15.000× magnification.
Figure 3:
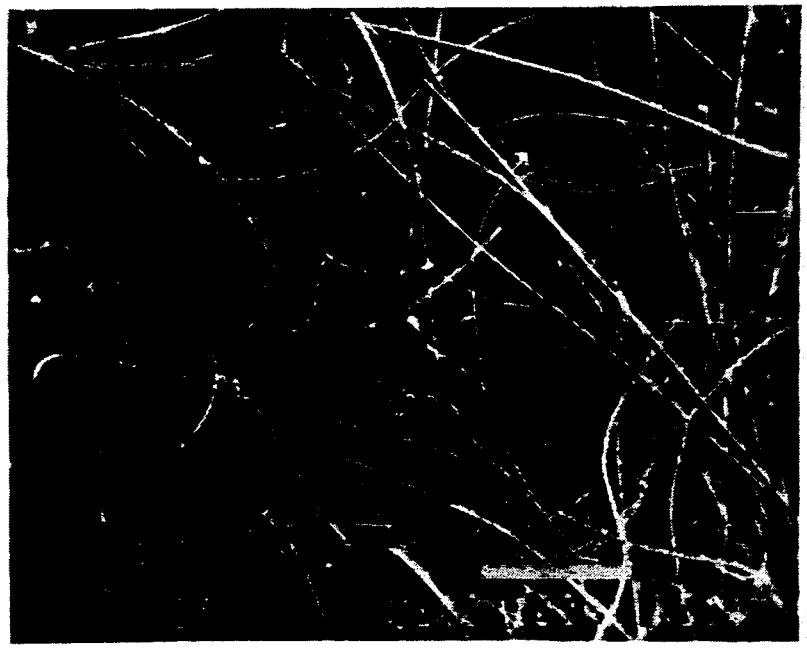
FIG. 3 is a SEM of zirconia fibers containing CaO, prepared according to the present invention; sintered in oven at 850° C. in air for 2 hours; 200× magnification.
Figure 4:
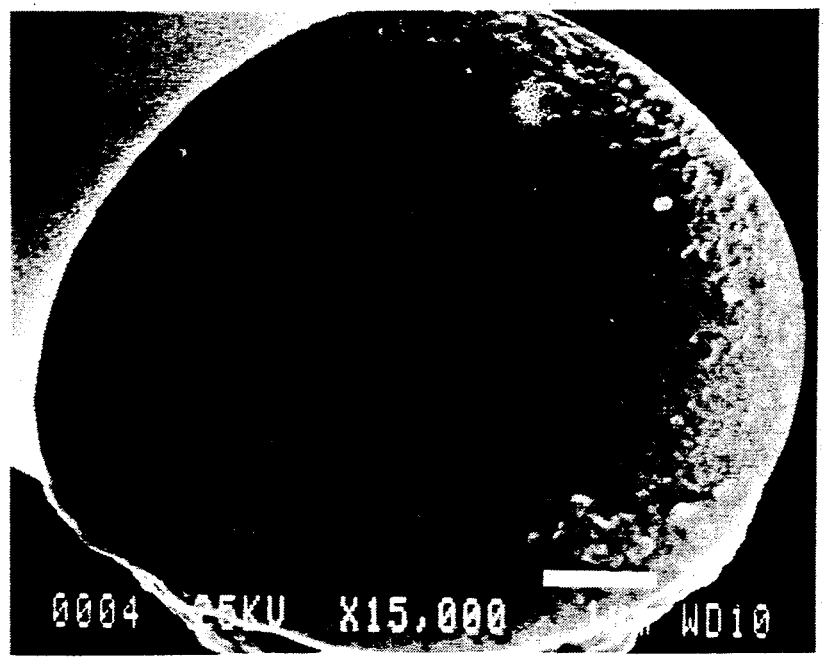
FIG. 4 is a SEM of a single zirconia fiber containing CaO, prepared according to the present invention; sintered in oven at 850° C. in air for 2 hours; 15,000× magnification.
Figure 5:
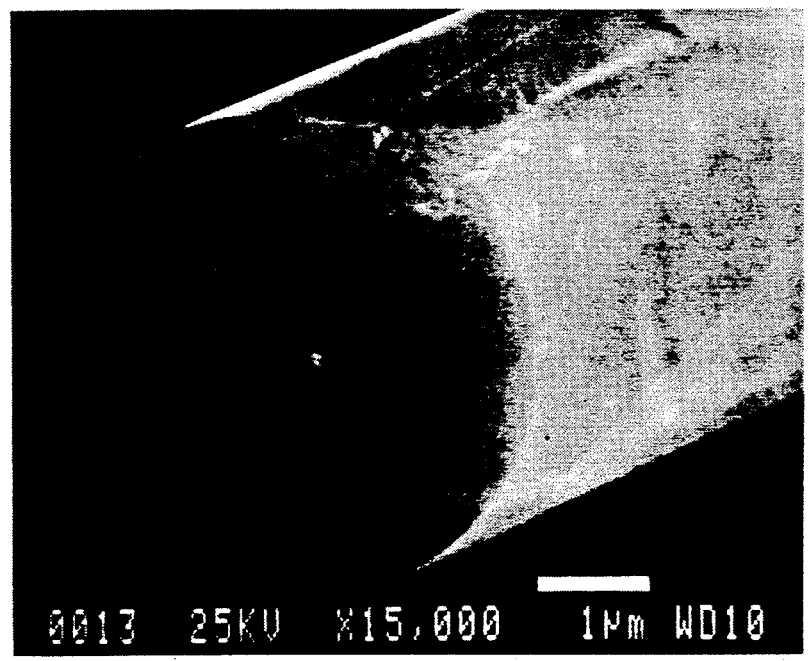
FIG. 5 is a SEM of a single zirconia fiber containing CaO, prepared according to the present invention; sintered in oven at 850° C. in air for 2 hours; 15,000× magnification.
Figure 6:
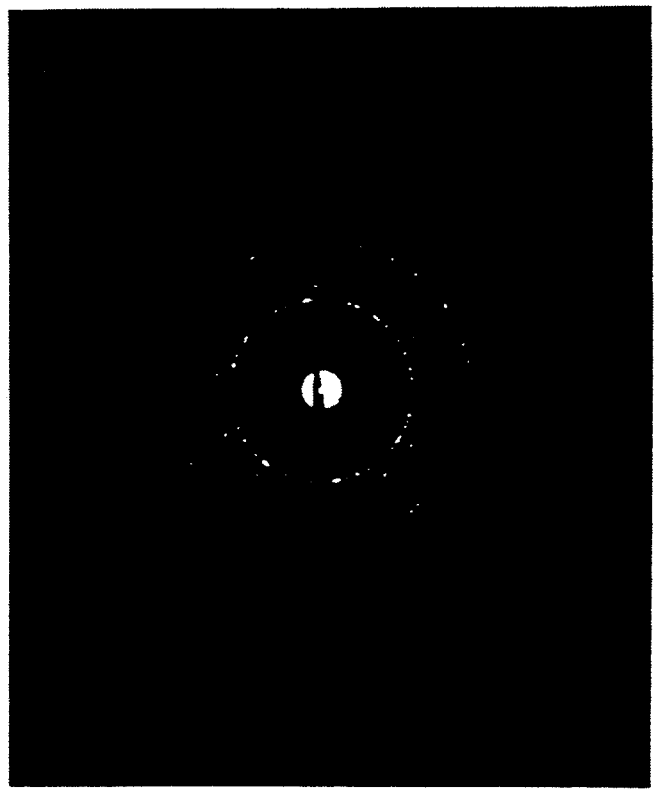
FIG. 6 is a selected area electron diffraction (SAED) pattern of zirconia fibers containing CaO, prepared according to the present invention, sintered in oven at 1000° C. in air for 2 hours.

In accordance with the present invention, novel processes for the production of water soluble, amorphous zirconium based granules are provided.

In one embodiment, an aqueous solution comprising a zirconium based compound of the formula $Zr(R)_4$ as defined herein earlier is prepared. Preferably the solution will contain about 1 to 99 wt % $Zr(R)_4$ and most preferably about 10 to 50 wt % $Zr(R)_4$ based upon the total weight of the solution.

Although water is the preferred and the most practical solvent to utilize in this embodiment, it is within the spirit and scope of the present invention that solvents of similar polarity to water may be utilized non-limiting examples of which include dimethyl sulfoxide, acetone, acetonitrile, tetrahydrofuran, n-propanol, and butanol.

With regard to the zirconium compound of the formula

R will preferably represent

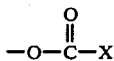

wherein X is preferably a $C_1$ to $C_{10}$ alkyl group and most preferably X represents methyl such that $Zr(R)_4$ is zirconium acetate.

Once the aqueous solution has been formed, the zirconium based compound is mixed with the solution of about 2 to 15 wt %, preferably 6 to 10 wt %, of a phase stabilizing agent based upon the total weight of zirconium oxide in solution. Suitable phase stabilizing agents are well known to those skilled in the art of which non-limiting examples include CaO, $CeO_2$, $Y_2O_3$, MgO, $SiO_2$, $HfO_2$, $Dy_2O_3$, $Yb_2O_3$ and the like.

It is also within the scope of the present invention to employ metal salts of phase stabilizing agents, e.g. calcium hydroxide, yittrium acetate, cerium acetate, and hafnium oxychloride, which upon heating convert to their oxide form.

The pH of the solution once the phase stabilizing agent has been added should be in the range of about 4 to 7 and preferably about 2 to 5.

Zirconium based granules are then formed by heating the pH adjusted and aqueous zirconium complex containing phase stabilizer to a temperature no greater than about 250° C. until all of the aqueous (or the like) solution is evaporated and the resulting zirconia based complex containing the phase stabilizer thereby becomes granular in nature.

If the solution is heat above 250° C., the resulting granules will not have good solubility in water as the hydrogen bonding in the zirconium complex will probably have been destroyed.

In an alternate embodiment, an alcohol (or the like) solution of $Zr(R)_4$ is prepared. In this embodiment, the $ZrO_2$ content of the solution will preferably be in the range of about 1 to 99 wt %, and most preferably about 10 to 40 wt %, based upon the total weight of the solution.

Although an alcohol is the most suitable type of solvent to be employed in the alternate embodiment, it is within the spirit and scope of the present invention that solvents of similar nature and polarity can be utilized non-limiting examples of which include acidified water, dimethyl sulfoxide, tetrahydrofuran, and acetone.

In this alternate embodiment of the present invention, the R group of $Zr(R)_4$ will preferably represent —OX wherein X preferably represents a $C_1$ to $C_{10}$ alkyl group and most preferably X represents propyl such that $Zr(R)_4$ is zirconium propoxide.

When R represents —OX, the alcohol solvent will preferably be of the formula R'OH wherein R' corresponds to X. For example, propanol should preferably be the solvent for zirconium propoxide.

After the solution is formed, it is then acidified and hydrolyzed in either order.

In the acidification step, the pH of the solution should be adjusted to between about 2 to 5, preferably about 2 to 3, with the use of any suitable acid and preferably an organic acid such as acetic acid.

In the hydrolysis step, water is preferably added in an amount of from about 1 to 90 wt %, most preferably 10 to 30 wt %, based upon the total weight of zirconium atoms in solution or otherwise in an amount sufficient to hydrolyze the solution of zirconium compound, e.g. zirconium propoxide, to the desired degree.

After acidification and hydrolysis, about 1–35 wt % phase stabilizer and preferably about 6–10 wt % phase stabilizer is added to the solution based upon the total weight of $ZrO_2$ in the solution and the solution is then heated to below 250° C. to form water soluble, amorphous zirconium based granules which can function as zirconium oxide precursors.

In some instances a zirconium based foam or the like may develop during the evaporation process. Granules or flakes or the like can be readily produced by merely crushing or grinding the foam.

The zirconium based granules made by the inventive process have utility as coatings for glass fibers and the like to enhance their fire resistance and alkali resistance properties and as disclosed in another embodiment of the present invention can be used to manufacture fibers of zirconium oxide.

According to this embodiment of the present invention, zirconium oxide (zirconia) fibers can be readily made by first making an aqueous solution of either zirconium based granules to the desired viscosity. Preferably, in order to get a solution which will fiberize well, the viscosity should be in the range of about 8,000 to 30,000 c.p.s. and most preferably about 12,000 to 26,000 c.p.s.

In accordance with the invention, the liquid is fiberized by any convenient method such as, for example, centrifugal spinning, drawing, blowing, tack-spinning, rotary spinning, and by extrusion of the liquid though a spinneret or suitable combinations thereof.

The fiber is then heated or sintered for a time sufficient and at a temperature sufficient to oxidize the zirconium based complex to zirconium oxide. The heating typically occurs in an oxygen containing atmosphere such as dry air or ozone. Although an oxygen containing atmosphere is typically utilized, it is thought possible that in some instances, heating can occur in an oxygen free atmosphere since the presence of water in the spinning solution can sometimes be sufficient to convert zirconium based compounds to oxides upon heating.

The heating or sintering temperature is preferably between about 100° C. to 1800° C. and more preferably between about 250° C. to 1250° C. The heating time is in excess of about 15 minutes and is preferably in excess of about 1 hour.

With regard to the phase structures of the zirconia fibers produced by the present invention, they will be in an amorphous state until they are heated to a temperature in the range from above about 500° C. to about 1100° C. at which region they are in the tetragonal crystal phase. At temperatures from above about 1100° C. to about 1900° C. some of the fibers are still in the tetragonal phase and some will be in the monoclinic phase depending on the type of stabilizer used and at temperatures above about 1900° C. they are in the cubic phase.

The following non-limiting examples serve to further illustrate the present invention.

EXAMPLE I

This example illustrates the preparation of amorphous zirconium hydroxy hydrogel granules from zirconium alkoxide solution, e.g. zirconium n-propoxide.

491.34 grams of zirconium n-propoxide of 21.6 wt. % zirconium content were added with mixing to 791.52 grams of n-propanol to provide a homogeneous solution. The pH was adjusted to 2-3 by the addition of 198.17 grams of glacial acetic acid and finally by the addition of 1.5 liters of water. The reaction mixture was mixed for ½ hour at room temperature. To 2.2 lbs. of the resulting zirconium hydroxy hydrogel (17.6 wt. % $ZrO_2$ content), was added approximately 6 wt. % of CaO of calcium acetate powder (17.96 grams) as a stabilizer.

The solution was mixed thoroughly until it became clear. Then the solution was evaporated to dryness using a microwave oven at about 120° C. The chemical composition (wt. %) of the resulting amorphous zirconium based granules was as follows:

%C=16.69; %H=2.89; %Ca=9.69; %Zr=49.90

EXAMPLE II

This example illustrates the preparation of amorphous zirconium based granules from zirconium acetate.

6.94 grams of commercially available $Ca(OH)_2$ powder were added with mixing to 250.0 grams of aqueous zirconium acetate, (21-22 wt. % of $ZrO_2$), to provide a clear homogeneous solution having a pH of about 4-5 and an equivalent weight ratio of 10:1 of $ZrO_2$ to CaO and an equivalent solids contents of about 75 weight percent. The resulting aqueous dispersion was slightly cloudy on mixing but became clear when mixed completely.

The solution was transferred into a suitable container and evaporated to dryness using a conventional microwave oven. During the evaporation, the temperature did not exceed 150° C.-180° C. The resulting granules were colorless and amorphous as shown by X-ray diffraction. An elemental analysis of the granules showed the following composition:

%C=15.97; %H=3.02; %Ca=9.71; %Zr=50.1.

EXAMPLE III

This example illustrates the preparation of zirconium based flakes from a zirconium oxychloride starting solution.

7.45 grams of commercial $Ca(OH)_2$ was added with mixing to 281.74 grams of an aqueous zirconium oxychloride ($ZrOCl_2$) solution of 20% w/w $ZrO_2$ and $HfO_2$ and 12% w/w HCl to provide a homogeneous yellow solution having an equivalent weight ratio of 10:1 of $ZrO_2$ to CaO and an equivalent solids content of about 50 weight percent.

The solution was transferred into a suitable container and evaporated to dryness using a conventional microwave oven. During the evaporation the temperature did not exceed 150°-180° C. Upon drying a yellow foam was formed. The foam was then crushed into small flakes.

EXAMPLE IV

This example illustrates how solutions of controlled viscosity can be prepared by utilizing the amorphous granules produced by the process of the present invention.

Utilizing the previously disclosed procedures, amorphous zirconium based hydroxy hydrogel granules were prepared from zirconium acetate and zirconium propoxide solutions using appropriate amounts of yttrium acetate, cerium acetate, hafnium oxychloride and collidial silica and mixtures thereof as phase stabilizing agents. The zirconium based solutions containing the phase stabilizers were evaporated to granules in a microwave oven at a temperature not exceeding 150° C.-180° C. The final composition weight ratio (zirconia:stabilizing agent) of amorphous granules was in the range of about 10:0.6-0.8.

In each instance when the prepared granules were added to water in a weight ratio of about 4:3 and placed on drum rollers, the granules were completely dissolved and viscosity of the resulting solution was about 6000 c.p.s. The viscosity of each solution could be adjusted to the desired level by either adding additional granules or water.

EXAMPLE V

This example illustrates the production of partially or fully stabilized $ZrO_2$ fibers derived from a viscous precursor solution of zirconium acetate which was treated and formed into granules by the procedure of Example II.

The fibers were formed by feeding a viscous mass of 8,000 to 30,000 centipoise to a centrifugal spinning machine with a 5 3/8" diameter head having multiple holes of 0.012" in their smallest dimension. The spinning conditions are given in the Table I.

The fibers were removed from the collection chamber and sintered in air by placing the fibers in an electric furnace at a temperature of 250° C. for 2 hours. The 250° C. fired fibers were further fired in air in a furnace as below:

The physical properties of $ZrO_2$ fibers derived from Run 5 of Table I are shown in Table II.

TABLE I

| Run | Viscosity cps. × $10^3$ | Air Ring Pressure (psig) | Disc (Psig) | Box Temp °F. at the beginning of run | Disc Temp °F. at the beginning of run | $ZrO_2$ Fiber Precursor solution temp °F. at beginning of run | Comments on spinning |
| --- | --- | --- | --- | --- | --- | --- | --- |
| 1 | 23 | 7 | 7 turned up to 12 | 160 | 88 | 27 | spun very well |
| 2 | 22 | 7 | 11 turned up to 12 | 160 | 92 | 34 | spun very well |
| 3 | 24 | 7 | 7 turned up to 12 | 162 | 88 | 37 | spun very well |
| 4 | 9.6 | 7 | 12.5 | 160 | 89 | 68 | spun well |
| 5 | 25 | 7 | 7 up to 12 | 175 | 88 | 25 | spun very well |
| 6 | 23 | 7 | 12 | 115 | 98 | 34 | spun very well |

TABLE II

| Fiber | Firing | Fiber[a] Density g/cm3 | Fiber[b] Diameter Microns | Surface Area[c] by BET, m2/g | Crystallite Size[d] by X-ray, Angstrons | X-ray diffraction, $ZrO_2$[e] phase relative intensity | | |
| --- | --- | --- | --- | --- | --- | --- | --- | --- |
| | | | | | | % monoclinic | % tetragonal | % cubic |
| I | 250° C. 2 hrs | 3.103 | 8.586 | 0.1782 | 0 | Amorphous | | |
| II | 500° C. for 2 hrs | 4.315 | 0.052 | 29.4535[c] | 68A° | | 100 | |
| III | 850° C. for 2 hrs | 4.773 | 3.210 | 0.0476 | 132A° | <1 | >99 | — |
| IV | 1000° C. for 2 hrs | 5.028 | 2.773 | 0.5517 | 235A° | <1 | >99 | — |

Notes:
[a]Density measurements by pycnometer and water as the filling solution
[b]Measured by optical microscope and BET method
[c]Indicates nitrogen runs due to high surface area
[d]Warren-Averbach Crystallite size determination
[e]The X-ray analysis of the 1000° C. fired fibers revealed the presence of exclusively $ZrO_2$ crystallites in metastable tetragonal form, the CaO component being undetected

EXAMPLE VI

An aqueous solution comprising 5% zirconia was prepared by dissolving 3.38 g. of zirconia precursor granules, prepared as described in Example II, in 100 g. of tap water. A 0.36 g, 11.0 cm diameter fiber glass mat with binder burned off (30 minutes at 500° C.) was dipped into the solution and on removal excess solution was drained out of the glass mat by applying suction. The mat was then cured in an electric oven for 15 minutes at 150° C. The weight of coating on the glass mat was found to be 0.37 g.

An 11.0 cm diameter sample of the above inventive treated glass mat was then subjected to a fire test over a gas burner fitted with a circular jet of diameter 35 mm, the sample being held on a support 100 mm metal ring 50 mm above the burner nozzle. The temperature of the flame at the sample position was determined as 950° C. No smoke, no fire structure damage, and no shrinkage of the inventive treated glass mat was observed even after 3 hours of continuous firing. Under an identical firing test, a glass mat melted within a second or two.

Reasonable modifications and variations are possible from the foregoing disclosure without departing from either the spirit or scope of the present invention as defined by the claims.

I claim:

1. A process for the production of amorphous zirconium based granules, said process consisting essentially of the steps of:

(a) forming a solution comprising $Zr(R)_4$ or zirconyl halide in an alcohol solvent wherein each R individually represents either

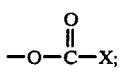

—OX; —$NO_3$; halogen; or —OH; and X represents a $C_1$-$C_{10}$ hydrocarbyl group;

(b) adding in either order (i) an acid in an amount sufficient to acidify said solution comprising $Zr(R)_4$ or zirconyl halide to a pH in the range of about 2-5 and (ii) water in an amount sufficient to hydrolyze said $Zr(R)_4$ or zirconyl halide thereby forming a solution comprising a zirconium based complex;

(c) adding about 1-35 wt % of a suitable phase stabilizer to the resulting solution of step (b); and (d) drying the solution comprising said zirconium based complex and phase stabilizer at a temperature below about 250° C. for a time sufficient to evaporate said solution thereby forming zirconium based granules containing said phase stabilizer.

2. A process according to claim 1 wherein R represents —OX and X represents a $C_1$ to $C_{10}$ alkyl group.

3. A process according to claim 1 wherein $Zr(R)_4$ is zirconium propoxide.

4. A process according to claim 1 wherein said phase stabilizer is calcium oxide.

5. The process of claim 1 wherein $Zr(R)_4$ is zirconyl nitrate.

6. The process of claim 1 wherein the solution of step (a) is comprised of zirconyl chloride.

7. The process of claim 5 wherein the phase stabilizer is calcium oxide.

8. The process of claim 6 wherein the phase stabilizer is calcium oxide.

* * * * *

UNITED STATES PATENT AND TRADEMARK OFFICE
CERTIFICATE OF CORRECTION

PATENT NO. : 5,053,214

DATED : October 1, 1991

INVENTOR(S) : Sivananda S. Jada

It is certified that error appears in the above-identified patent and that said Letters Patent is hereby corrected as shown below: ON THE TITLE PAGE In the Title of the Invention, insert after the word "granules", the words --- and zirconium oxide fibers ---.

In Column 3, Line 13, delete the number "15.000X" and insert in its place the number --- 15,000X ---.

Signed and Sealed this

Twenty-fifth Day of January, 1994

Attest:

BRUCE LEHMAN

*Attesting Officer*  *Commissioner of Patents and Trademarks*